United States Patent
Fauser et al.

(10) Patent No.: US 8,069,069 B2
(45) Date of Patent: Nov. 29, 2011

(54) METHOD FOR LOADING FLIGHT SCHEDULE MODIFICATIONS

(75) Inventors: Dietmar Fauser, Nice (FR); Edouard Hubin, Nice (FR); Renaud Arnoux-Prost, Nice (FR)

(73) Assignee: Amadeus s.a.s, Biot (FR)

( * ) Notice: Subject to any disclaimer, the term of this patent is extended or adjusted under 35 U.S.C. 154(b) by 1144 days.

(21) Appl. No.: 10/518,515

(22) PCT Filed: Jun. 13, 2003

(86) PCT No.: PCT/FR03/50008
§ 371 (c)(1),
(2), (4) Date: Dec. 20, 2004

(87) PCT Pub. No.: WO03/107229
PCT Pub. Date: Dec. 24, 2003

(65) Prior Publication Data
US 2005/0209896 A1    Sep. 22, 2005

Related U.S. Application Data

(60) Provisional application No. 60/444,624, filed on Feb. 4, 2003.

(30) Foreign Application Priority Data

Jun. 18, 2002   (FR) .................................. 02 07458

(51) Int. Cl.
*G06Q 10/00*   (2006.01)
(52) U.S. Cl. ............................................................ 705/5
(58) Field of Classification Search .................. 705/5–6
See application file for complete search history.

(56) References Cited

U.S. PATENT DOCUMENTS

| | | | | |
|---|---|---|---|---|
| 4,775,936 A * | 10/1988 | Jung | ............................... | 705/5 |
| 5,652,867 A * | 7/1997 | Barlow et al. | ...................... | 703/6 |
| 6,408,276 B1 * | 6/2002 | Yu et al. | ............................. | 705/7 |
| 2002/0178034 A1 * | 11/2002 | Gardner et al. | ................... | 705/5 |

(Continued)

FOREIGN PATENT DOCUMENTS

WO       0163533 A2     8/2001

OTHER PUBLICATIONS

Benjamin G. Thengvall', Jonathan F. Bard', Gang Yu, Balancing user preferences for aircraft schedule recovery during irregular operations IIE Transactions vol. 32, Iss. 3, 2007.*

(Continued)

*Primary Examiner* — John Hayes
*Assistant Examiner* — Tonya Joseph
(74) *Attorney, Agent, or Firm* — Young & Thompson

(57) ABSTRACT

A method for loading flight schedule modifications in an air travel computerized reservation system, wherein: the flight schedule database is updated; the reservations concerned by the flight schedule modifications are reassigned to update the reservation inventory database. The method for loading flight schedule modifications includes the following steps: receiving at least one lot of modifications containing flight schedule modification data, retrieving individual modifications contained in the lot and storing in a register in the form of records for future scheduling, simulating reassignment of the reservations concerned by the flight schedule modification, by accessing with the reservation distribution server both the records and the flight schedule database, final updating of the flight schedule databases and of the reservation inventory. The method is useful for updating databases during flight schedule modifications in computerized reservation systems.

5 Claims, 2 Drawing Sheets

Arrival of a flight

Signature

A=Future Scheduling Record

U.S. PATENT DOCUMENTS

2002/0184060 A1* 12/2002 Schmitz et al. .................. 705/6
2003/0177044 A1* 9/2003 Sokel et al. ..................... 705/5
2003/0191678 A1* 10/2003 Shetty et al. .................... 705/8
2003/0225600 A1* 12/2003 Slivka et al. .................... 705/5

OTHER PUBLICATIONS

Benjamin G. Thengvall, Gang Yu, Jonathan F. Bard, Multiple fleet aircraft schedule recovery following hub closures, Transportation Research Part A: Policy and Practice, vol. 35, Issue 4, May 2001, pp. 289-308, ISSN 0965-8564, DOI: 10.1016/S0965-8564(99)00059-2. (http://www.sciencedirect.com/science/article/pii/S0965856499000592).*

Dusan Teodorovic et al. "Model for Operational Daily Airline Schelduling", Transportation Planning and Technology, 1990, vol. 14, pp. 273-285.

EP Office Action dated May 18, 2010 in corresponding 03760062.4.

* cited by examiner

METHOD FOR LOADING FLIGHT SCHEDULE MODIFICATIONS

The present invention relates to a method of loading flight scheduling changes into a computerized air transport reservation system.

The scheduling changes in such systems require very large manipulations of the existing schedule database.

Flight schedule describes the manner in which the aerial network is followed by the aircraft. Scheduling is calculated for the purpose of optimizing the connection between flights, use of aircraft and the occupation of seats. Changes to be given to an existing schedule are for this reason generally changes which are not isolated, which have a possible impact on correspondence with other flight operations.

At present, flight schedules are subject to more and more reorganization, given the composition, the need for agreement between the airlines and the sophistication of the computer means to establish schedules.

Usually, the airlines make scheduling changes one after the other. During these changes, the person charged with making the changes has no knowledge of the seat reservations existing on aircraft which he is changing.

The aircraft reservation inventory system applies changes to the schedule database without being capable of apprehending over all the number of changes and modifications which this involves.

The present procedure used, consisting in applying scheduling changes one after the other, has a first drawback which consists of the fact that the reservations already made are generally changed more often than necessary. This situation arises particularly if the passengers are rescheduled for another flight and this latter is accordingly subject to a change. In this latter case, it is necessary further to modify the passenger reservation.

Passenger reservation changes are costly because they give rise to manual intervention on the part of travel agents, network costs and computer processing.

Another drawback of the present methods used, is that large changes to be given to an existing schedule database can occupy a long time because the repercussions on the reservations of the passengers must be analyzed manually on a case by case basis.

The object of the invention is to provide a solution to the problem of flight scheduling changes in a computerized air transport reservation system.

To provide for this purpose a new method in which there is used updating of the flight schedule database and the assignment of the reservations in question by changes of flight scheduling for updating the reservation inventory database, in a particular manner.

A first advantage of the invention is to method a plurality of flight scheduling changes in an overall manner, which permits envisaging the assignment of passenger reservations taking account of the integrality of these changes, no matter what the order of the changes in the scheduling modification file.

Moreover, according to the invention, the scheduling changes are applied by means of a simulation without final activation, which avoids risks of disturbance of the existing database before complete finalization and validation of the update.

To provide an overall choice in the reassignment of passenger reservations, the invention permits the server to have access both to the existing database and to new records corresponding to future schedule which is to be used.

It will be noted that the gains of efficiency of the invention are particularly great, especially given the massive overall character of the scheduling changes to be carried out.

By way of example, there can be distinguished different types of procedure for scheduling changes:

seasonal changes which comprise massive scheduling changes varying in size from 2000 to 8000 lines and which generally require a validation of several instances of the control organization of the computerized air transport reservation system, readjustments. Generally, it is a matter of changes affecting flights and a near departure date and for which the reassignment of the reservations is particularly important and requires particular consideration.

regular changes which can be carried out in a largely automatic fashion, given their nature.

The present invention permits loading such changes no matter what their nature and also permits controlling an assembly of automation parameters of the updates to be carried out.

Within this scope, there can be easily be adjusted the level of manual control to be performed for the changes in question.

Other objects and advantages will become apparent from the course of the description which follows, of a preferred embodiment of the invention, which is however not limiting.

The present invention relates to a method for loading flight schedule changes in a computerized air transport reservation system, in which:

the flight schedule database is updated;

the reservations in question by changes of flight schedules are reassigned to update the reservation inventory database, characterized by the fact that it comprises the following steps:

reception of at least one group of changes containing flight scheduling change data, extraction of the individual changes contained in the group and storing in a register as future schedule records, simulation of the assignment of the reservations in question by scheduling changes, by access of the reservation distribution server both to the records and to the flight schedule database, final updating of the flight schedule and of the reservations inventory databases.

This method will preferably have the following modifications, according to which:

there is used a graphical user interface for verification of the changes in the group of changes.

there is used a graphical interface user for the validation of the reassignments of reservations.

there is assigned a characteristic suffix (SL) to the changes to be stored as future schedule records (FSR)

there is assigned to each record (FSR) an argument (FSR is published) indicating whether this record (FSR) has been made accessible to the reservation distribution server.

for each change extracted:

flight periods are opened from the flight schedule database that are affected by the change;

if said period has not already been assigned by a change whose argument (FSR is published) is positive, said period is duplicated and the suffix (SL) is attached to the duplicated period;

there is sent a scheduling change message to integrate the change into the duplicated period that it affects;

it is indicated that the change is record accessible to the reservation distribution server by placing its argument (FSR is published) in the positive state.

upon simulation of reassignment, the dependencies between records are updated given that a record A depends on a record B if and only if the reassignment of the passengers upon the application of record A that takes place for future schedule described in record B.

in the case of cyclical dependence between several records, upon the execution of the reassignment operations in the reservation system, one modifies only once and each reservation in question by all of these reassignments.

the records (FSR) are deleted after final updating of the flight schedule and of the reservations inventory databases.

The accompanying drawings are given by way of example and do not limit the invention. They represent only one embodiment of the invention and permit its easy comprehension.

Figure 1:
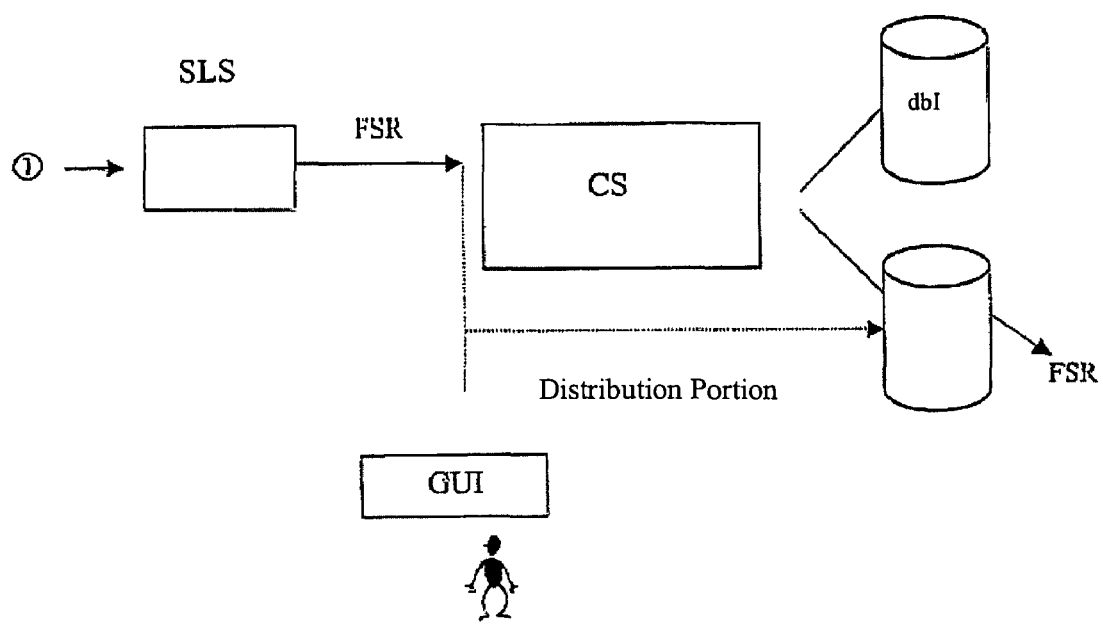
FIG. 1 shows schematically the configuration of different computer means adapted to be used to practice the invention.

Referring to FIG. 1, it is shown that the method given here can use the scheduling change server SLS adapted to receive a group of scheduling change tasks to be carried out. Moreover, this change server SLS is accessible to a user such as an analyst or a supervisor by means of a graphical user interface GUI in particular for verification of the changes made in the change file constituting the group of change tasks and for the validation of the reassignments of reservations.

A portion of the steps of the method of the invention can moreover be carried out in the distribution portion of the reservation system in the distribution server CS and of the existing database db1 comprising the database of reservation inventories and the flight schedule database.

In the scheduling change server SLS, upon the arrival of a group of changes, it is possible in the first instance to verify the integrity of the changes and of the possible conflict problems, to test the automation rules and to render the data accessible by means of the graphical utilizer interface GUI.

At this stage, different automation criteria could be carried out for each of the groups of changes to be made. In particular, the automation criteria concern the automation of the scheduling changes and the automation of the reservation reassignments. According to the value of these parameters, the changes can be processed manually or automatically or else can have certain manual steps and certain automated steps.

Preferably, analytical interveners perform a step of validation according to the processing and automation parameters which have been provided.

Figure 2:
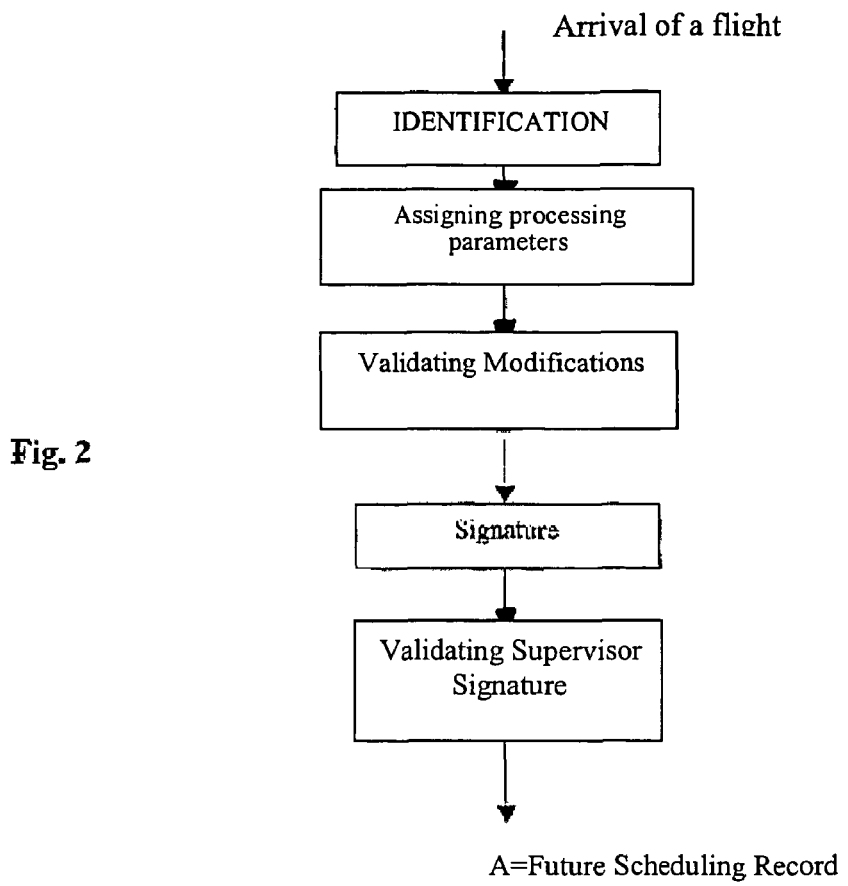
FIGS. 2 and 3 are block diagrams of various successive steps of the present invention.
Figure 3:
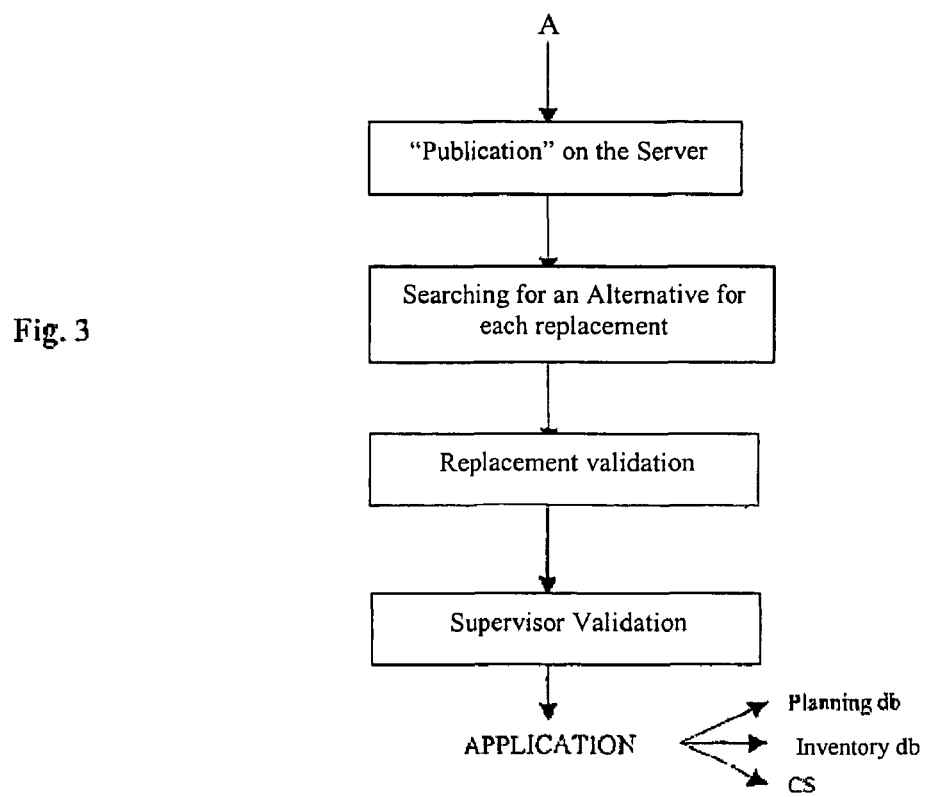

If desired, a supervisor can also carry out a verification thereafter. These steps of validation which lead to signature by the analysts and of the supervisor, are shown in FIG. 2.

At the end of these steps, it is possible to produce future schedule records which can be used by the central system in the distribution server CS. To this end, there is stored in a register of the different changes from the group of changes received in the form of future schedule records FSR.

The future schedule records FSR are rated accessible by the distribution server CS in the form of a publication. There will be described one possibility for a procedure provided for this purpose:

we start by determining the list of scheduling changes which must be published as future schedule records FSR. In this way, there are omitted all the changes which have no impact on the reassignments of the reservations, in particular changes which relate only to updating of service such as providing onboard airline meals.

for each of the scheduling changes of the list, there are carried out the following:

there is assigned to each record FSR a suffix SL which permits characterizing as a future schedule record FSR relative to the other data accessible by the distribution CS, there is assigned to each record FSR an argument, for example called "FSR is published" indicating whether this record FSR has been rendered accessible to the reservation distribution server CS or not. If the argument "FSR is published" is true, this means that the record FSR is accessible, there are noted, in the existing schedule, the flight periods which are affected by the change in question.

for each of these affected periods, researched whether it is already concerned by a schedule change which would have an argument "FSR is published" identified as true. If this is not the case, this period is duplicated by assigning the suffix SL. If the argument "FSR is published" is already true for a preceding change, it means that this period has already been duplicated. At this stage, the central system thus has a duplicate of the current schedule with the suffixes SL.

there is thus sent a schedule change message for the data having the suffix SL, this message describing how the future scheduling must be handled. The central system thus has future schedules perfectly described in the periods in question to which are assigned the suffix SL.

for this change of schedule, the argument "FSR is published" is placed in the condition of being true.

These different operations are then repeated for all the scheduling changes contained in the group until they all have an argument "FSR is published" in the true column.

Following these steps, the central system, and particularly the distribution service CS, is capable of accessing the future schedule records FSR so as to find the best flight alternatives during reassignment of the reservation.

It is this step which is then carried out.

There will be described hereafter in greater detail a preferred embodiment.

When it is completed and the updating of the databases is final, it will be possible to delete the future schedule records FSR.

There will now be described more precisely the steps of simulation of the reassignment of the reservation which precede the final updating of the flight and reservation schedule databases.

The reservation system automatically selects a reassignment option (for each change of scheduling requiring it). This option is selected from among the future schedules FSR or the current schedules (for flights not affected by the group in progress).

Once the automatic reassignment options are evaluated, the system verifies them thanks to the reassignment automation rules. The reassignments not satisfying these rules are subjected to validation by an operator (who will then modify the options automatically calculated by the system).

When all the reassignments have been validated, the application properly so called of the group of changes in the reservation system can begin.

To this end, it should first be noted that the reassignment of passengers rise problems of interdependence of the flights. There is meant by dependency between two scheduling changes, the necessity, to carry out a change (S1 for example)

relating to flight F1, to reassign certain passengers from the flight F1 to a future schedule S2 concerning a flight F2.

Moreover, there can be encountered questions of cyclic dependency in which the dependence of the flights is reciprocal.

In this context (for example suppose two scheduling changes S1 and S2 relating to flights F1 and F2 involve the reassignment of reservations of F1 to the future schedule of F2 and the reassignment of the reservations of F2 to the future schedule of F1), it would be necessary, during execution of the reassignments in the reservation system, of modifying only once each reservation in the context of a group of changes of reservation (so as to avoid in our example the passengers not being reassigned to future schedule of F2 and then again toward future schedule of F1).

During the execution of the group of scheduling changes, the schedule database is first of all updated.

The system then allocates the single operation identifier "I" characterizing the group in progress. The reservation system then receives the assembly of reassignment instructions as well as the operation identifier "I". It must then guarantee the uniqueness of modification of each reservation in the context of the operation "I".

The preferred embodiment of this constraint consists for each modification of reservation, to:

verify that this reservation does not have the mark "I",
modifying the reservation in this case
then marking the modified reservation with the identifier "I".

To the extent of reassignments, the inventory database is also updated.

The three databases (inventory, reservation and schedule) are then up to date and the FSR records can be deleted.

REFERENCES

SLS: Schedule change server
CS: Distribution server
db1: Existing database
GUI: Graphical user interface

The invention claimed is:

1. A method of loading schedule planning related data of an airline flight service and a flight schedule database of a computer based reservation system, comprising:

at least one computer programmed to perform the steps of:
  receiving at least one batch of flight schedule changes at a Schedule Loader server (SLS);
  extracting the changes contained in the batch and storing said changes as a set of Future Schedule Records (FSR) which are stored as temporary data available for passenger re-accommodation purpose;
  publishing the future schedule records (FSR) on a reservation distribution server; accessing the future schedule records (FSR) and the flight schedule database simultaneously by the reservation distribution server;
  simulating passenger re-accommodation options to determine the best re-accommodation option for each passenger among said future schedule records (FSR) and the data of the flight schedule database, said simulating step comprising the steps of:
    automatically selecting via the reservation distribution server a re-accommodation option from the data of the flight schedule database for the passengers on flights not affected by the future schedule records (FSR); and
    among the future schedule records for the other passengers,
    verifying of the re-accommodation options by the reservation distribution system by applying re-accommodation automation rules, and
    validating by an operator of the re-accommodation options which do not satisfy the re-accommodation automation rules; applying the changes in the flight schedule database by: detecting dependent re-accommodation options by checking whether some of the best re-accommodation options are comprised in said future schedule records (FSR);
  updating the flight schedule database starting with the future schedule records (FSR) comprising dependent re-accommodation options;
  updating the reservation inventory database according to the re-accommodations options determined during the simulation step; and
  deleting the future schedule records (FSR);
  wherein a characteristic suffix (SL) is assigned to the flight schedule changes and stored as future schedule records (FSR);
  wherein an argument is assigned to each record (FSR), said argument indicates whether this record (FSR) has been made accessible to the reservation distribution server;
  determining for each extracted change, corresponding flight periods of the flight schedule database and upon further determination that said corresponding flight periods have not already been affected by one change with positive argument, perform the further steps of:
  duplicating said period and assigning the suffix (SL) to the duplicated period; sending a scheduling change message to integrate the change in the corresponding flight period;
  indicating that the change is a record accessible to the reservation distribution server, by placing its argument (FSR is published) in the positive state.

2. The method according to claim 1, further comprising:
accessing via a Graphical User Interface for set up of the re-accommodation automation rules, for the verification step and for the validation step.

3. The method according to claim 1, wherein upon simulation of re-accommodation, a degree of dependency is attributed to each record as a function of the number of other records for which an application of said record gives rise to a re-accommodation of the reservations on said other records.

4. The method according to claim 1, wherein, in a case of cyclical dependence between several records, upon the execution of the re-accommodation operations in the reservation system, each reservation in question is modified only once by the assembly of these reassignments.

5. The method according to claim 1, wherein the records (FSR) are deleted after final updating of the flight schedule and the reservation inventory databases.

* * * * *